(12) United States Patent
Swindell et al.

(10) Patent No.: US 10,754,531 B2
(45) Date of Patent: Aug. 25, 2020

(54) DISPLAYING A THREE DIMENSIONAL USER INTERFACE

(71) Applicant: Embarcadero Technologies, Inc., Austin, TX (US)

(72) Inventors: Michael L. Swindell, Aptos, CA (US); John R. Thomas, Aptos, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 0 days.

(21) Appl. No.: 16/460,912

(22) Filed: Jul. 2, 2019

(65) Prior Publication Data
US 2019/0324633 A1 Oct. 24, 2019

Related U.S. Application Data (63) Continuation of application No. 15/660,722, filed on Jul. 26, 2017, now Pat. No. 10,365,813, which is a continuation of application No. 14/549,426, filed on Nov. 20, 2014, now Pat. No. 9,740,383, which is a continuation of application No. 13/538,845, filed on Jun. 29, 2012, now Pat. No. 8,922,557.

(51) Int. Cl.
| | |
|---|---|
| *G06F 3/0484* | (2013.01) |
| *G06F 1/16* | (2006.01) |
| *G06F 3/01* | (2006.01) |
| *G06F 3/0481* | (2013.01) |
| *G06T 15/20* | (2011.01) |
| *G06T 15/60* | (2006.01) |
| *G06T 19/20* | (2011.01) |

(52) U.S. Cl.
CPC ........ *G06F 3/04847* (2013.01); *G06F 1/1694* (2013.01); *G06F 3/012* (2013.01); *G06F 3/013* (2013.01); *G06F 3/04815* (2013.01); *G06T 15/20* (2013.01); *G06T 15/60* (2013.01); *G06T 19/20* (2013.01); *G06T 2200/1637* (2013.01); *G06T 2200/04* (2013.01); *G06T 2200/24* (2013.01)

(58) Field of Classification Search
CPC .. G06F 3/04847; G06F 3/04815; G06F 3/013; G06F 3/012; G06F 1/1694; G06F 2200/1637; G06T 19/20; G06T 15/60; G06T 15/20; G06T 2200/04; G06T 2200/24
See application file for complete search history.

(56) References Cited

U.S. PATENT DOCUMENTS

| | | | |
|---|---|---|---|
| 6,906,724 B2 | 6/2005 | Lake et al. | |
| 8,223,149 B2 | 7/2012 | Bavoil et al. | |
| 8,436,852 B2 | 5/2013 | Criminisi et al. | |
| 8,922,557 B2 | 12/2014 | Swindell et al. | |
| 9,740,383 B2 | 8/2017 | Swindell et al. | |
| 2012/0036433 A1 | 2/2012 | Zimmer et al. | |

(Continued)

*Primary Examiner* — Maurice L. McDowell, Jr.

(57) ABSTRACT

In a method for displaying a three dimensional interface on an electronic device, a three dimensional user interface control with three dimensional effects is displayed on a display of the electronic device, the three dimensional effects based at least in part on a position of a user relative to the display. The position of the user relative to the display is tracked. Responsive to detecting a change in the position of the user relative to the display, the three dimensional effects of the three dimensional user interface control are dynamically changed based at least in part on the change in the position of the user relative to the display.

20 Claims, 7 Drawing Sheets

(56) References Cited

U.S. PATENT DOCUMENTS

| | | |
|---|---|---|
| 2013/0016102 A1 | 1/2013 | Look et al. |
| 2013/0246954 A1 | 9/2013 | Gray et al. |
| 2013/0314398 A1 | 11/2013 | Coates et al. |
| 2013/0336640 A1 | 12/2013 | Nevarez et al. |

FIG. 1

Environment
200

FIG. 6

DISPLAYING A THREE DIMENSIONAL USER INTERFACE

RELATED APPLICATION

This application claims priority to and is a continuation of the co-pending patent application having application Ser. No. 15/660,722, entitled "CREATING A THREE DIMENSIONAL USER INTERFACE," with filing date Jul. 26, 2017, by Michael L. Swindell and John R. Thomas, and assigned to the assignee of the present invention, the disclosure of which is hereby incorporated herein by reference in its entirety.

The application with application Ser. No. 15/660,722, claims priority to and is a continuation of patent application having application Ser. No. 14/549,426, now issued as U.S. Pat. No. 9,740,383, entitled "CREATING A THREE DIMENSIONAL USER INTERFACE," with filing date Nov. 20, 2014, by Michael L. Swindell and John R. Thomas, and assigned to the assignee of the present invention, the disclosure of which is hereby incorporated herein by reference in its entirety.

The application with application Ser. No. 14/549,426, claims priority to and is a continuation of patent application having application Ser. No. 13/538,845, now issued as U.S. Pat. No. 8,922,557, entitled "CREATING A THREE DIMENSIONAL USER INTERFACE," with filing date Jun. 29, 2012, by Michael L. Swindell and John R. Thomas, and assigned to the assignee of the present invention, the disclosure of which is hereby incorporated herein by reference in its entirety.

FIELD OF THE TECHNOLOGY

The present technology relates generally to creating a user interface with three dimensional controls and effects.

BACKGROUND

Many electronic devices have displays for displaying information such as, text, pictures, graphics, videos and other user interface controls. Such displays may be used when executing software such as operating systems, application software, or apps. Typically, a display will display such information in a two dimensional fashion. A developer that desires to create a three dimensional interface for software or an app is required to spend a great deal of time developing three dimensional effects rather than spend time on developing the other features of the software or app.

BRIEF DESCRIPTION OF DRAWINGS

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "displaying," "detecting," "changing," "deforming," "altering," "providing," "receiving," "rendering," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Creating a Three Dimensional User Interface

Embodiments of the present technology are for creating a three dimensional user interface on a device. The interface may be described as the next generation user interface framework and may be called a three dimensional or Hyper-Real Holographic (HRH) user interface. An HRH user interface may be displayed on a device with a display that typically renders two dimensional images. An HRH user interface delivers a visual experience to the end user that gives a greater sense of realism, interactivity, and depth by tracking changes of perspective to render real-time lighting and shadows based on and from 3-dimensional (3D) mesh controls. In one embodiment, the present technology will detect a change in perspective at the device and the lighting source position and direction and camera angles will change in relation. This will affect the shadows cast by the controls and on the controls themselves. Thus the HRH user interface may dynamically change shading, lighting, shadows, size and shape of buttons or other user interface controls during a user experience. The lighting source and camera may be virtual and not actual physical lighting sources or camera. Changes in perspective may be detected by an accelerometer associated with the device, head or eye tracking, or by changes in other input user interface controls associated with the device. The lighting source and camera may be virtual and not actual physical lighting sources or cameras.

Hand held devices or other have been limited by the amount of resources available to the device e.g. processor speed, amount of memory, bandwidth, etc. Therefore graphics or visual display on such devices was limited to static two dimensional (2D) images. As devices progress, techniques emerged to simulate a three dimensional display. For example, one technique is to animate and pre-render a series of static 2D images to simulate or appear 3D. The present technology goes beyond merely animating static 2D images by providing dynamically changing images with interactive 3D shading, shadowing that change in response to a detected change in perspective. In other words, the present technology does not rely on pre-rendered animations to simulate a 3D display but rather renders the 3D effects in real-time. The present technology seeks to simulate realistic changes of shading, lighting and shadows that are detected by the human eye when perceiving a physical 3D user interface control. Interacting with the 3D user interface control may trigger an application event. Thus, the HRH user interface appears more realistic to human eye. Additionally, the present technology is able to provide a user with an interactive 3D experience by dynamically changing or altering portions of the interface as the user interacts with the different portions of the interface. The altering may include deformations, animations, movements, etc.

The present technology is designed to be associated with, executed on, or run by a variety of different devices with different user interface controls and a variety of different platforms for the devices. For example, the present technology may be employed with a handheld device running a mobile operating system or a desktop computer system running a desktop operating system.

Embodiments of the present technology are also for providing developers with tools for creating a three dimensional user interface to be executed at a device. For example, the present technology may provide a developer a catalogue of scenes and a catalogue of three dimensional user interface controls. The developer may select scenes and user interface controls to be used in an HRH user interface for a software application or app developed by the developer. The present technology will then render a 3D or HRH user interface based on the developer's selections. Thus the developer does not have to spend time developing an HRH user interface for the software application and can focus development time on the software application itself.

The present technology provides for many examples of how creating a three dimensional user interface may be used in various environments for a variety of purposes. The following discussion will demonstrate various hardware, software, and firmware user interface controls that are used with and in computer systems and other user devices for creating a three dimensional user interface using various embodiments of the present technology. Furthermore, the systems, platforms, and methods may include some, all, or none of the hardware, software, and firmware user interface controls discussed below.

Creating a Three Dimensional Interface

Referring to the figures, exemplary embodiments of the technology will now be described. The following description will focus on an embodiment of the present technology, which is implemented using a device with an operating environment or platform such as an operating system. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

Figure 1:
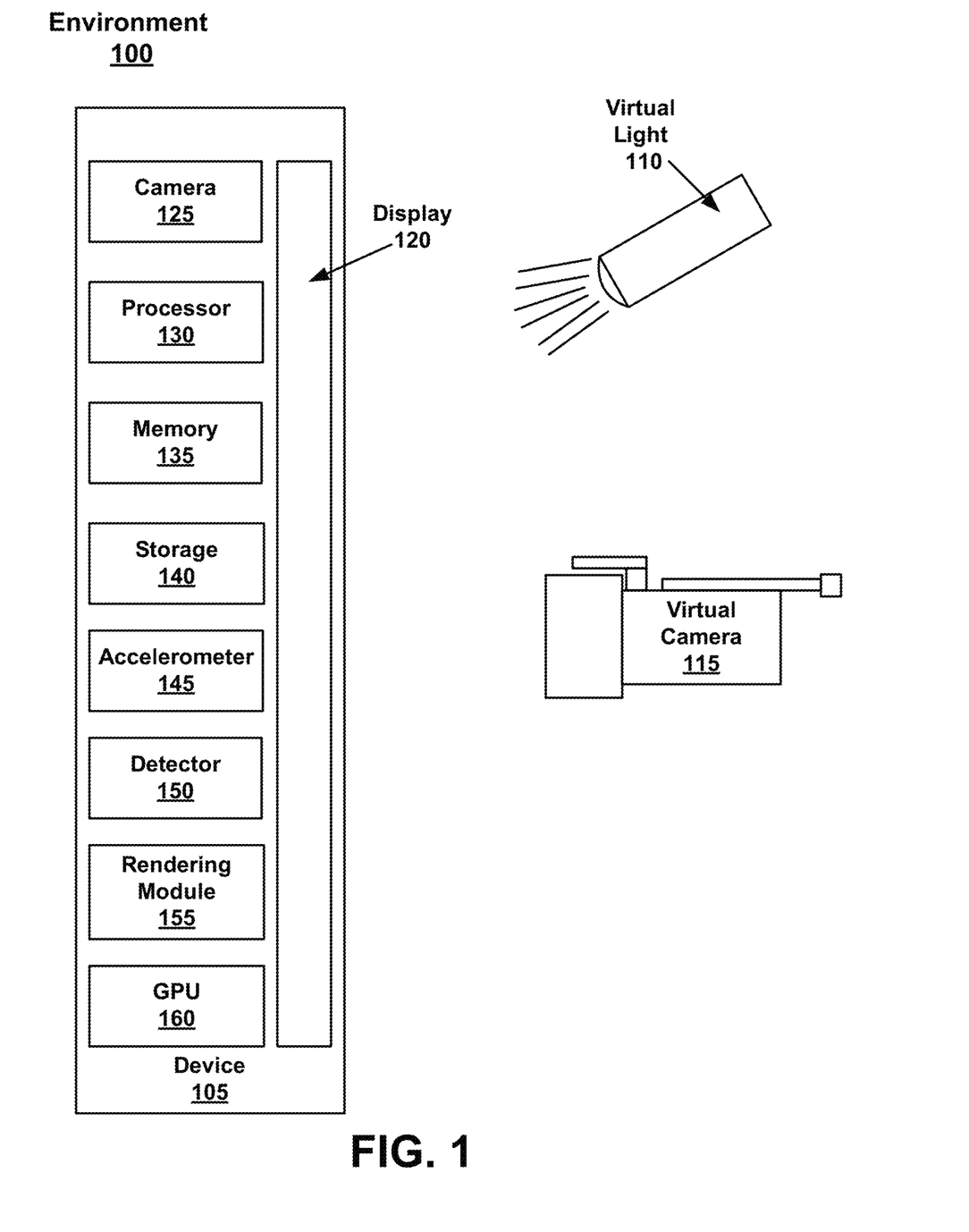
FIG. 1 is a block diagram of an environment for creating a three dimensional interface in accordance with embodiments of the present technology.

FIG. 1 is a block diagram illustrating environment 100 which is an example environment comprising device 105, virtual light 110 and virtual camera 115 in accordance with embodiments of the present technology. Environment 100 depicts device 105 as a hardware device for carrying out the present technology. Device 105 may be a general purpose computer system, an embedded computer system, a personal computer such as a desktop computer, a laptop, a notebook, an electronic handheld device, a personal digital assistant, a smart phone, a tablet computer, a net book, user devices, or the like. In one embodiment, device 105 comprises memory 135 and processor 130 such as a central processing unit that carries out the instructions of a computer program such as an operating system or portions of the present technology. Storage 140 is a computer readable medium or storage and may be flash memory, a hard disk drive, a solid state drive, an optical disk, or the like. Device 105 is capable of executing a software application or app that employs a 3D or HRH user interface. Device 105 may also comprise a graphics processing unit (GPU) such as GPU 160 to process and render a display features.

Device 105 may comprise accelerometer 145 which is an accelerometer that measures acceleration in device 105. Accelerometer 145 may detect changes in motion or position of device 105 and may be used in conjunction with a gyroscope. A gyroscope may detect a change in position of device 105 based on a gyration of device 105. Device 105 may be an off the shelf device such as a smart phone that comprises a user interface control such as accelerometer 145. In one embodiment, device 105 comprises camera 125. Camera 125 is an image receiving device that may be a digital camera or a video camera. Camera 125 may be used by the present technology to track movement of device 105 or to track movement of a user's eye and/or head. Camera 125 and accelerometer 145 may both be used as input user interface controls to detect a change in perspective for purposes of dynamically changing the 3D user interface. It should be appreciated that that device 105 may also have other input user interface controls that may be used to detect a change in perspective such as a touch screen, track pad, mouse, track ball, motion sensor, etc. For example, device 105 may comprise a mouse wherein the user interface employs a cursor moved by the mouse. A change of the cursor to a different region of the user interface may be detected as a change in perspective. In one embodiment, a user may employ an input device such as a track ball to manually change a perspective.

In one embodiment, device 105 comprises display 120. Display 120 may be embedded, attached, coupled to, stand-alone, or separate from device 105. For example, a desktop computer system may have an independent monitor or screen whereas a smart phone has an embedded display. Display 120 may be a liquid crystal display (LCD), a touch screen, a plasma screen, a projector, a cathode ray tube monitor, or any other electronic display. Environment 100 depicts a cross sectional view or side view of device 105 where display 120 faces virtual light 110 and virtual camera 115.

In one embodiment, virtual light 110 is a virtual light with a position, a direction of angle, and a brightness. Virtual light 110 is used by the present technology to render shading, lighting, and shadows associated with user interface controls in the HRH user interface. In one embodiment, the HRH user interface regards the virtual light as being static and does not change the position of the virtual light when a change in movement or position of device 105 is detect or a change is perspective of device 105 is detected. In one embodiment, the virtual light is dynamic and changes position, for example, changing position with the time of day.

In one embodiment, virtual camera 115 is a virtual camera which represents a user's perspective of display 120 and the HRH user interface. For example, virtual camera 115 may be relative to a point of origin in three dimensional space such as (0, 0, 0) representing x, y, and z coordinates. The z-axis representing the angle of view into the display. The HRH user interface then uses this data to render 3D effects on user interface controls in the HRH user interface. The HRH user interface, in conjunction with device 105, may detect when a change in perspective has occurred. For example, accelerometer 145 may detect a change in acceleration of device 105. That data is then used to detect a change in perspective that may or may not be an actual change in perspective of the user of device 105. The change in perspective may then be used to change the position and angle of virtual camera 115 relative to the position and angle of virtual light 110. This relative change in position and angle is then used to dynamically render or change the 3D effects associated with user interface controls in the HRH user interface. Such changing or rendering may occur in real-time thus simulating an actual change in perspective of shading, lighting and shadows associated with a physical user interface control. The magnitude of the relative change in position and angle may be based on the magnitude of the change in perspective detected. In one embodiment, virtual camera 115 is replaced by actual user movements of the user's head or eyes which may be detected by camera 125 and used to change or render 3D effects of HRH user interface.

In one embodiment, device 105 comprises detector 150 to detect a change in position of device 105 after receiving data from an input user interface control of device 105. The change in position is used to determine a change in perspective of the user or virtual camera 115 has been detected. In one embodiment, device 105 comprises rendering module 155 which receives data regarding the determined change in perspective and renders a change in 3D effects of a user interface control. In one embodiment, rending module 155 comprises a GPU such as GPU 160. In one embodiment, rendering module 155 is also to alter a characteristic of a three dimensional user interface control based on a detected interaction of a user with the three dimensional user interface control. The characteristic may be an alteration, a deformation, an animation, a movement, a change in position, and an execution of application logic. The alteration may be a break, a bend, an elongation, a change in size, or a change in shape of the three dimensional user interface control. Such altering may also occur to a layer or scene of the user interface.

Figure 2:
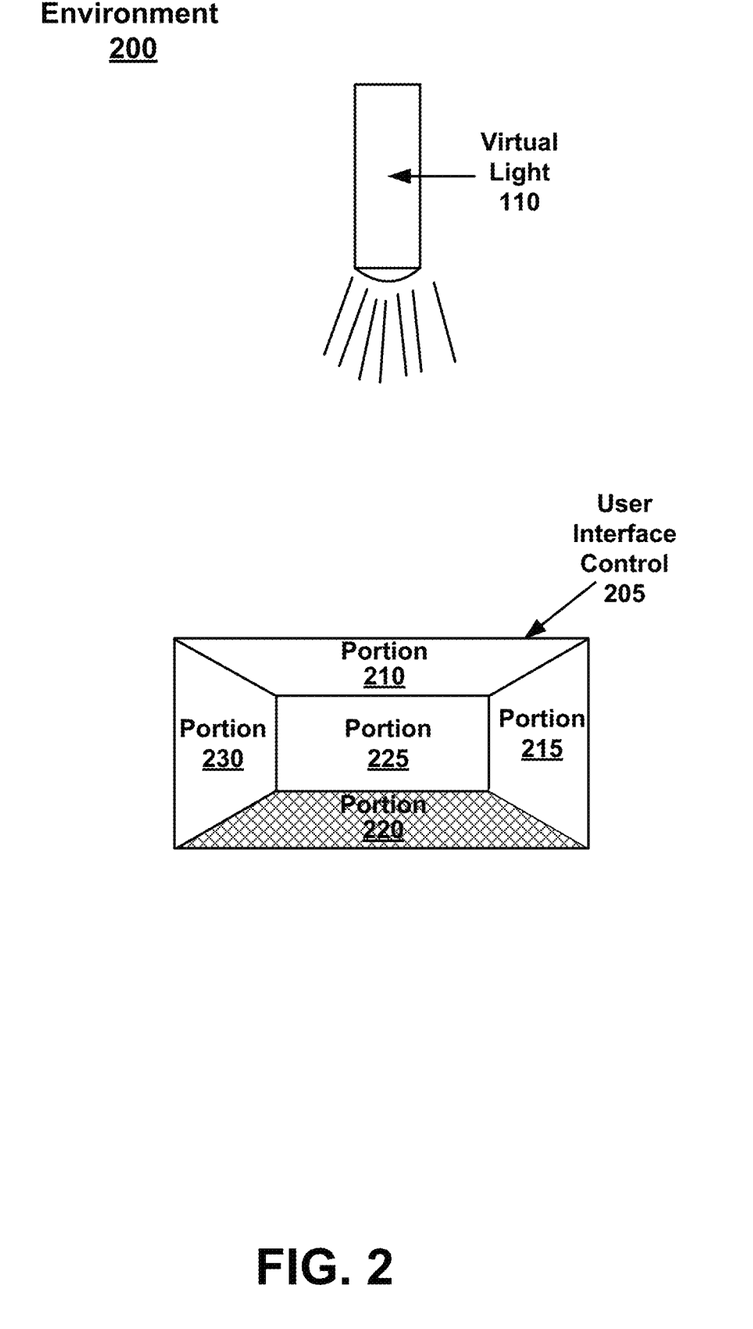
FIG. 2 is a block diagram of a user interface control with shading in accordance with embodiments of the present technology.

With reference now to FIG. 2 a block diagram of environment 200 of a user interface control with shading effects in an HRH user interface. Environment 200 depicts virtual light 110 which has the same abilities, features, and properties of virtual light 110 of FIG. 1. User interface control 205 is a user interface control that is part of the HRH user interface. In one embodiment, user interface control 205 is a graphic or picture of a rendered three dimensional polygon mesh. User interface control 205 may also be an object or a user control such as a button or a switch. In one embodiment, user interface control 205 allows a user to directly interact with it and to trigger an application event. In one embodiment, user interface control 105 is a graphical object on a touch screen display and a user interacts with the object by touching or gesturing in relation to user interface control 105. For example, a user may be able to interact with the user interface control to trigger an event such as selecting a menu option or controlling media with controls such as play, stop, pause, rewind, etc. The frame work of an app or software application may include the user interface with a user interface controls where the frame work is able to detect an on-click event when the user selects or otherwise interacts with the user control. This detection then triggers an application event. An application event may be the app executing logic or software code. The event may be run in an event handler. Thus the app and user interface controls may be event driven.

In one embodiment, user interface control 205 is one of a series of user interface control user interface controls. The user interface controls may each be designed or designated to control or trigger different events. Such user interface controls may comprise symbols, shapes, or text that make the user controls easily identified. For example, a series of user interface controls may be for controlling the playback of a media such as a video or audio file and may be characterized as media controls. In one embodiment, the media controls comprise a button with a triangle shape pointing right for the play control, a square for the stop control, two parallel vertical lines for the pause control, two left pointing triangles for the rewind control and other commonly recognized controls. Thus a user may readily identifier the user interface controls as media controls because of the ubiquitous use of such symbols as media controls. Other common symbols, shape and text that are readily recognized as user interface controls may be employed.

Environment 200 depicts user interface control 205 as a rectangular shape with five portion including portion 210, portion 215, portion 220, portion 225 and portion 230. It should be appreciated that that user interface control 205 may be any type of shape and is not limited to a rectangle with five portions. User interface control 205 may be a standard polygon such as a triangle rectangle, square, etc. or may be an irregular shape. User interface control 205 may be divided into any number of portions to show lighting and shading effects. Environment 200 may also comprise a real camera to determine a user's perspective. In one embodiment, the HRH user interface displays user interface control 205 with lighting and shading based on virtual light 110 to simulate lighting and shading of a physical user interface control similar to user interface control 205. For example, user interface control 205 may be simulating a rectangular button that where portion 225 is raised above the back portion of user interface control 205 and portions 210, 215 and 220 are planes tapering from the back to the front of user interface control 205. Thus when virtual light 110 shines, or is simulated to shine, on portion 210 of user interface control 205, the HRH user interface simulates lighting by shading portion 210 lighter than portions 215, 225 and 230. Portion 220 is rendered to simulate shading by rending portion 220 darker than portions 215, 225 and 230. This lighting and shading may be dynamically changed as a change in perspective is detected. User interface control 205 may be described as a 3-dimensional mesh based control.

For example, the detected change in perspective may detect that the device 105 has changed position relative to virtual light 110 such that virtual light 110 now shines on portions 210 and 230 which are rendered lighter than portion 225 and portions 215 and 220 are rendered darker simulate being shaded. The change in shading may occur gradually or rapidly in real time based on the speed of the detected change in perspective. It should be appreciated that the present technology may comprise a plurality of user interface controls being shaded by virtual light 110 and may be shaded different based on their relative distance to the virtual light and virtual camera. Additionally, a plurality of virtual lights may be used to simulate shading and lighting on one or more user interface controls.

In one embodiment, user interface control 205 comprises a plurality of attributes. Each attribute may have an initial condition that is set at design time. The attribute may be further altered or modified programmatically. The attributes may be text type, color, size, position, layout rules, style, and associated user interface events.

Figure 3A:
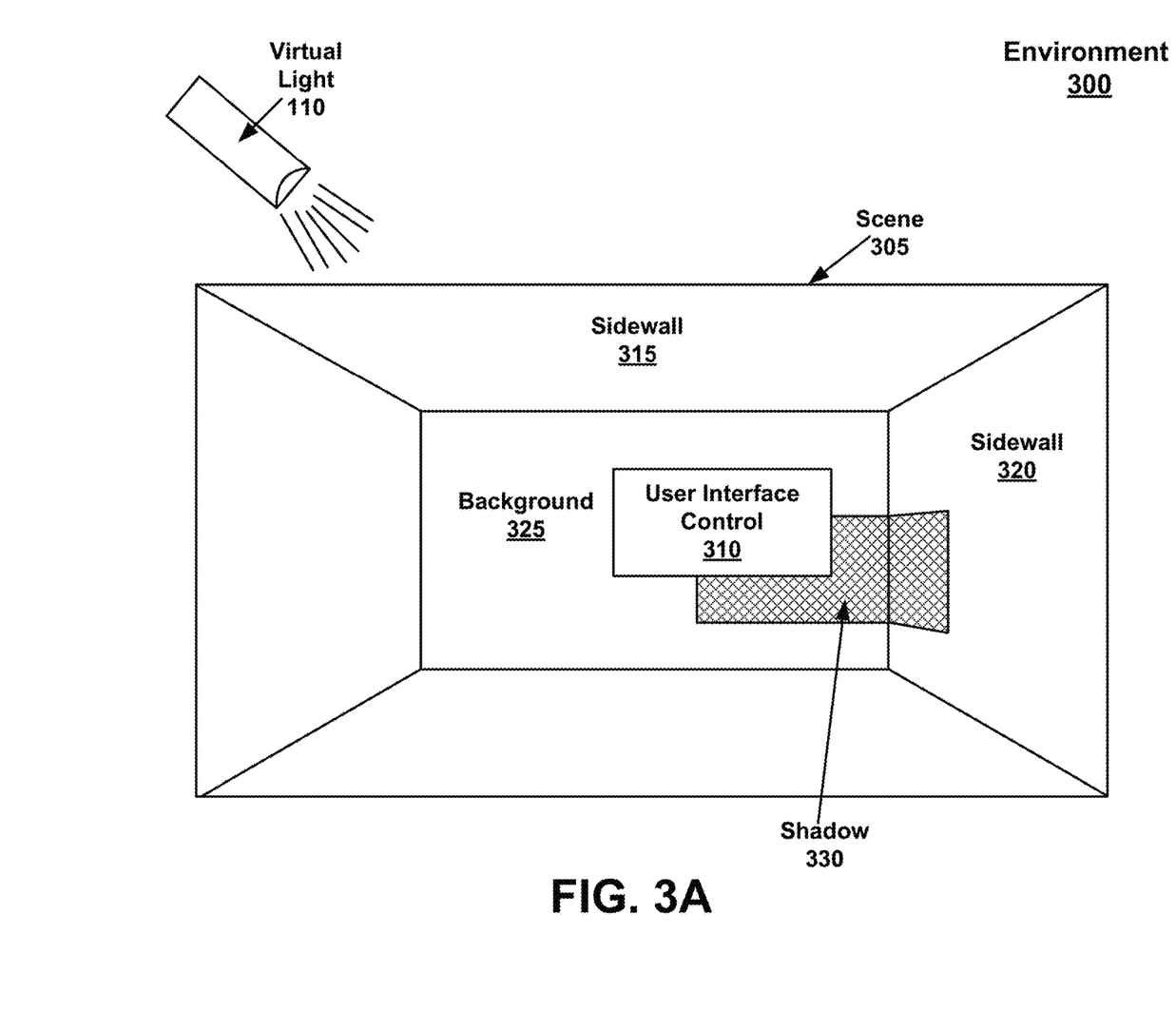
FIG. 3A is a block diagram of a user interface control with shadow in a scene in accordance with embodiments of the present technology.

With reference now to FIG. 3A a block diagram of environment 300 of a user interface control in a scene casting a shadow in an HRH user interface. Environment 300 depicts user interface control 310 in scene 305 with shadow 330. Environment 300 also depicts virtual light 110 which may be a virtual light and has all the same properties, features and abilities of virtual light 110 of FIG. 1. The HRH user interface renders scene 305 as a layer or background in the interface. User interface control 310 is rendered as sitting on top of a virtual layer or in the foreground of scene 305. Scene 305 is rendered such that background 325 is considered further back than sidewall 315, 320 and the other sidewalls. Thus user interface control 310 is rendered as casting a different shadow on background 325 than on sidewall 320. The change in shape of shadow 330 on sidewall 320 relative to background 325 presents a visual effect that simulates sidewall 320 as tapering away from the foreground of the interface to background 325. Thus scene 305 simulates a physical 3D scene. Environment 300 may also comprise a real camera to determine a user's perspective.

Virtual light 110 may also be used to simulate shading and lighting on user interface control 310 in the manner described for user interface control 205 of FIG. 2. As a change in perspective is detected, scene 305 may change positions relative to virtual light 110 and thus shadow 330 would change positions on scene 305 in real-time. The shading and lighting of user interface control 310 may also change as shadow 330 changes in scene 305.

Scene 305 has several user interface controls and functionality required to achieve the visual effects of an HRH user interface. This basic user interface control list includes 3D space that provides a background, foreground and sidewall "canvas" layers, at least one camera and directional light source, a perspective tracking device, and at least one 3-dimensional mesh based control.

Scene 305 may be described as an open box with the foreground being the open portion of the box and the user is looking into the box, the back of the box represented by background 325 and the sides of the box represented by sidewall 315, 320 and the other sidewalls. It should be appreciated that scene 305 is not limited to a box but may be any number of shapes with any number of regular or irregular sidewalls. In one embodiment, scene 305 only comprises a background and no sidewalls. In one embodiment, the background and/or sidewalls of scene 305 may not be flat or planar but may bumps or other irregularities. The HRH user interface may comprises a plurality of scenes or layers where user interface control 310 would cast different shadows on each layer or scene with respect to user interface control 310 position relative to each scene or layer and relative to virtual light 110. Additionally, scene 305 may comprise a plurality of user interface controls that may be different varieties of shapes and sizes and may be positioned at different depths in scene 305 and consequently have different lighting, shading and shadows relative to one another.

Figure 3B:
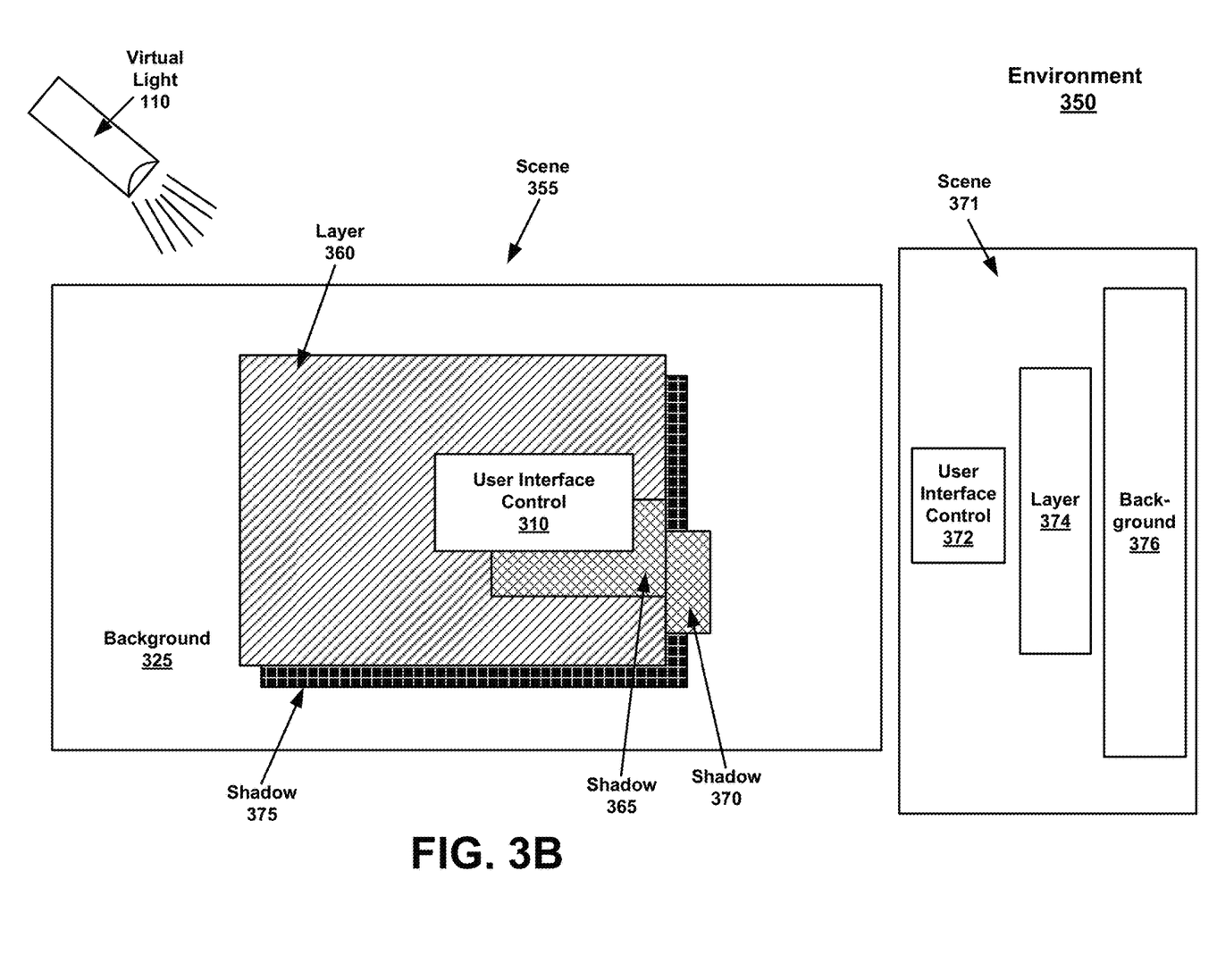
FIG. 3B is a top and side view of block diagrams of a user interface control in a scene in accordance with embodiments of the present technology.

With reference now to FIG. 3B a top and side view of block diagrams of user interface controls in a scene. FIG. 3B depicts environment 350 which depicts a top view of scene 355 and a side view of scene 371. Scene 355 depicts user interface control 310 with shadows 365 and 370. Scene 355 also depicts layer 360 with shadow 375. Environment 350 also depicts virtual light 110 which may be a virtual light and has all the same properties, features and abilities of virtual light 110 of FIG. 1. The HRH user interface renders background 325 as a layer or background in the interface. It should be noted that background 325 is depicted with no sidewalls and may be described as an infinite background in an x-y plane. User interface control 310 is rendered as sitting on top of layer 360 which is a virtual layer. Scene 355 may comprise any number of layers of various sizes and shapes. User interface control 310 casts shadow 365 onto layer 360 and shadow 370 onto background 325. The different size and placement of the two shadows simulate a space or distance between layer 360 and background 325. Additionally, layer 360 is depicted as casting shadow 375 onto background 325. It should be appreciated that shadows 365, 370 and 375 are dynamic and may move based on either a movement of virtual light 110 or a virtual camera (not depicted).

Scene 305 is rendered such that background 325 is considered further back than sidewall 315, 320 and the other sidewalls. Thus user interface control 310 is rendered as casting a different shadow on background 325 than on sidewall 320. The change in shape of shadow 330 on sidewall 320 relative to background 325 presents a visual effect that simulates sidewall 320 as tapering away from the foreground of the interface to background 325. Thus scene 305 simulates a physical 3D scene. Environment 300 may also comprise a real camera to determine a user's perspective.

Scene 371 shows a side view of a scene which, in one embodiment, is scene 355. Scene 371 also depicts side views of user interface control 372, layer 374 and background 376. In one embodiment, user interface control 372 is a side view of user interface control 310, layer 374 is a side view of layer 360, and background 376 is a side view of background 325. It should be appreciated that in practice, user interface control 372, layer 374 and background 376 are displayed on a screen and a side view may not be possible. However, scene 371 is depicted to provide a visual representation of how the components of scene 371 are rendered with three dimensional effects.

Figure 4:
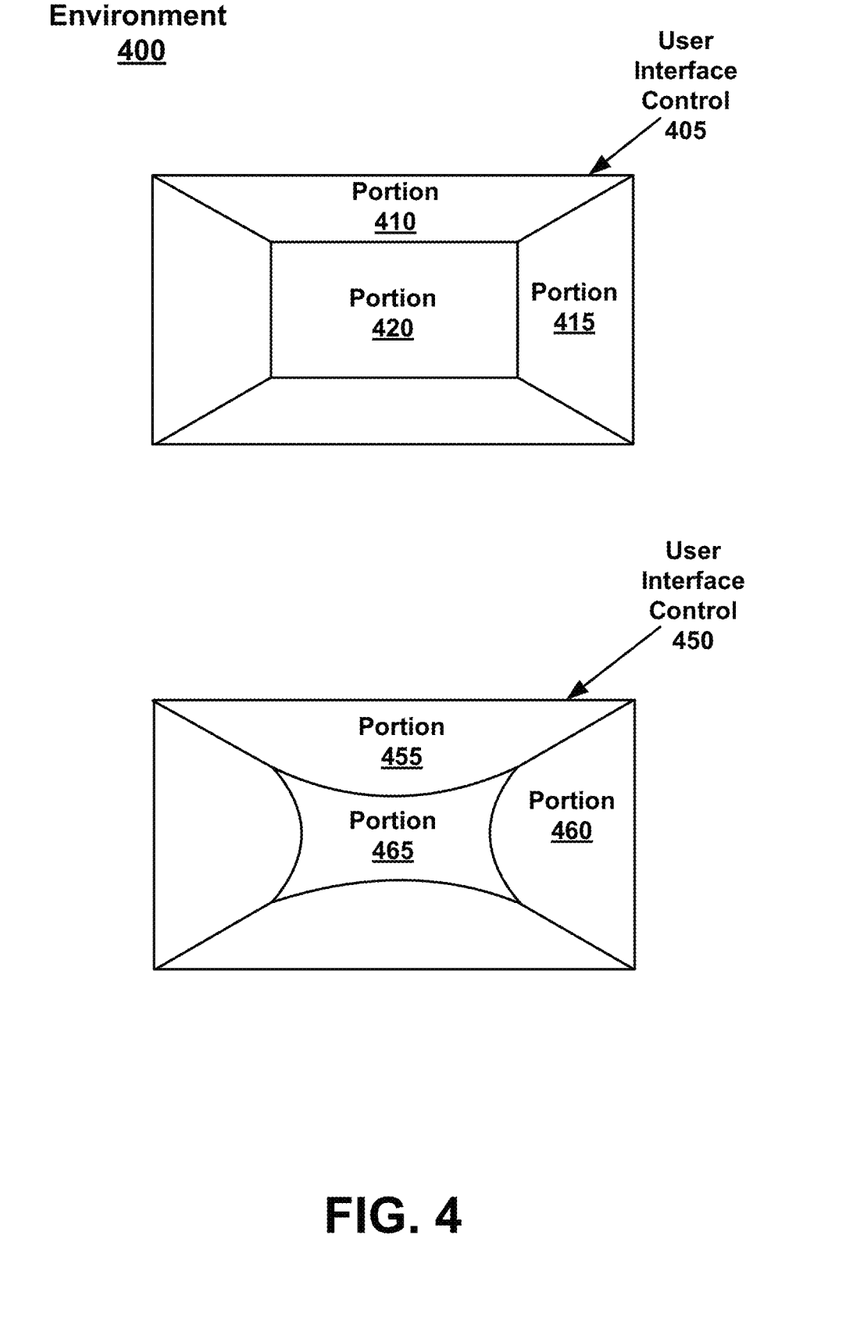
FIG. 4 is a block diagram of a user interface control and an altered user interface control in accordance with embodiments of the present technology.

With reference now to FIG. 4 a block diagram of environment 400 of user interface control 405 and user interface control 450. Environment 400 depicts user interface control 405 before it is altered and user interface control 450 during an alteration. In one embodiment, the HRH user interface may deform or change the shape and 3D effects of a user interface control, layer, or scene as a user interacts with it. For example, the user interface control may be a button that is pressed by the user on a touch screen. The button will then alter upon being pushed. Such alterations or changes in shape may be dynamic as the user interfaces with the user interface control. For example, the longer a button is pushed the more it may alter. Such alterations may be based on physics engine to simulate the way a physical user interface control would alter or change such as a rubber button or a chain link fence. User interface control 405 is depicted as being a rectangular button with straight planar portions 410, 415 and 420. In one embodiment, user interface control 405 is pressed by a user and is altered to look like user interface control 450 where portions 455, 460 and 465 are altered and not straight. Additionally, the lighting, shading, shadows and other 3D effects of a user interface control may be altered, deformed, animated, moved, or changed as the user interacts with the user interface control. Additionally, a layer in the HRH user interface may alter, deform, change shapes, and/or 3D effects as a user interacts with the layer. For example, a layer may be designed to resemble a chain link fence and the user interface controls or buttons on the layer are like signs on a chain link fence. When a user presses on such a layer, the user interface controls on the layer will be pulled toward the depressed point on the layer like a sign on a chain link fence would be. It should be appreciated that a single user interaction with the HRH user interface may interact with a single user interface control, a plurality of user interface controls, a layer, a plurality of layers, or a combination of layers and user interface controls. Thus the user interface controls or layers that the user interacts with feel as though they are being manipulated by the user thus simulating a user manipulating a physical user interface control or material.

3D Space

An HRH user interface form is a 3D space that provides a layer or several layers upon which to place controls, images, video, and upon which to cast shadows. In one embodiment, from the perspective of the user, the 3D space looks like the inside of a cardboard box with a flat bottom and side layers that are perspective transformed to show the depth of the background layer. From the perspective of the developer during design time, each layer is available to set properties, such as color, material, reflective properties, image or video, etc. The foreground layer is transparent to the user, with the ability to set the level of opacity, but this is where the top layer of user interface controls would be rendered.

Layers

HRH user interfaces can have more than just one foreground layer that can be stacked into the 3D space at some interval depth. This could allow the developer to design for multiple "user interfaces" but use the depth of the 3D space to organize the layers of user interface. Layers may also take up a subset of the perspective space for new UI design approaches. In one embodiment, only the foreground layer allows for active user interaction.

Foreground Layer

The Foreground layer, and additional layers within the 3D space not related to the sidewalls or background, is capable of hosting 3D controls. It provides a plane of orientation for design and runtime placement of controls within the 3D space. The Foreground layer is the layer that is at the top of the 3D space and is the "active" layer. During runtime of the HRH user interface, this is the primary layer that the user will interact with. They will primarily interact with controls on this layer however this layer is also selectable for various input including multi-touch and swipe gestures. To provide a greater sense of physical realism, the foreground layer will deform when touched and it will affect the controls around it. For example, imagine the foreground layer is a chain-linked fence and the controls are signs attached to the chain link fence. When a chain link fence is pressed, it deforms in the direction of the push and any attached signs are "pulled" toward the deformation.

Camera

The camera, or virtual camera, will start with a default position looking down the origin from the z axis in front of the foreground layer so that the full foreground layer is visible within the near field of the camera frustum with the look-at point at the middle of the background layer. When a perspective change is handled the camera will smoothly rotate about the look at point so that the user has a sense the viewpoint is changing as the perspective changes.

For instance, if the perspective changes to look at the scene from the lower right corner, the user would be able to see more of the top and left side layers and less of the bottom and right layers. The user would also be able to see more of the bottom and the right side of any 3D controls on a layer and less of the top and left side of any 3D controls much like a holograph.

Light

There must be at least one light source which may be a virtual light source. This light source should be directional and pointing into the 3D space from above the foreground layer in the z axis. This will provide the effect of shading in real-time. Today, many user interface controls are pre-rendered to providing a shading effect which make them look 3D. In HRH user interfaces, the controls are 3D meshes and will realistically shade based on the direction of the light. If the light moves then the shading updates in real-time. Additionally and HRH control that has any opacity will cast a shadow onto the layers within the 3D space.

Shadows

The next feature to deliver the experience of depth is real-time shadows. Any control that has any opaqueness will cast a shadow onto layers in the 3D space. The shadows should be hard or soft depending on the light source. In one embodiment, a directional light will cast hard shadows where an ambient light will cast soft shadows. The shadows will distort if they cross layer boundaries. For instance if the shadow extends off of the background layer on to the right layer it will be stretched as if it is being cast on a sidewall with the correct perspective.

Perspective Tracking Device

To deliver the change in perspective, an external tracking device needs to detect the change and inform the HRHUI. For instance, an accelerometer or gyroscope can be used to detect changes in the yaw, pitch, and roll of the device. This change will affect user perspective and HRHUI will react automatically as previously discussed. Additional tracking device could be a camera (on a laptop or phone/tablet) that can do head or eye tracking. For example, on a mobile device the default device could be an accelerometer.

Developer Tools

Embodiments of the present technology are also for providing developers with tools for creating a three dimensional user interface to be executed at a device. In one embodiment, the present technology comprises a developer interface for developing a software application or app with 3D effects where the software application implements an HRH user interface. The developer interface and employing the developer interface may referred to as design time whereas a device executing a software application with an HRH user interface may be referred to as run time. In one embodiment, the developer interface may allow a developer to click and drag user interface controls, scenes, layers, graphics, icons, text and the like into a position to develop the layout user interface controls within an HRH user interface for the app.

In one embodiment, the developer interface has access to a catalogue of user interface controls and a catalogue of scenes for use by the developer. A catalogue may be a library, a binary library, a database, or some other repository. The developer may select scenes and user interface controls to be used in an HRH user interface for a software application or app developed by the developer. In one embodiment, the designed selects a scene, layer or object by clicking and dragging a scene layer or object onto a design surface. The developer may also select types of shading, lighting, and shadowing as well as how those 3D effects are dynamically changed during run time. Other attributes of the user interface control may be controlled, changed or designed such as color, texture, text size, object size, the way the user interface control is rendered, etc. Such changes to the attributes of a user interface control may be reflected in real time as the app is designed. The developer may also select how user interface controls such as button deform or perform other effects as they interact with users. The present technology will then render a 3D or HRH user interface for a software app based on the developer's selections. Thus the developer does not have to spend time developing an HRH user interface for the software application and can focus development time on the software application itself.

The developer interface may be executed on a device such as a computer system. The software application created by the developer interface may be run on the same device it was created on or on a different device such as device 105 of FIG. 1 or a plurality of devices. The developer interface and associated processes may be described as design time. The HRH user interface and its associated processes may be described as run time. In one embodiment, the same catalogues of user interface controls and scenes at design time are deployed at run time. In one embodiment, only a portion of the catalogues of user interface controls and scenes at design time are deployed at run time.

Operations

Figure 5:
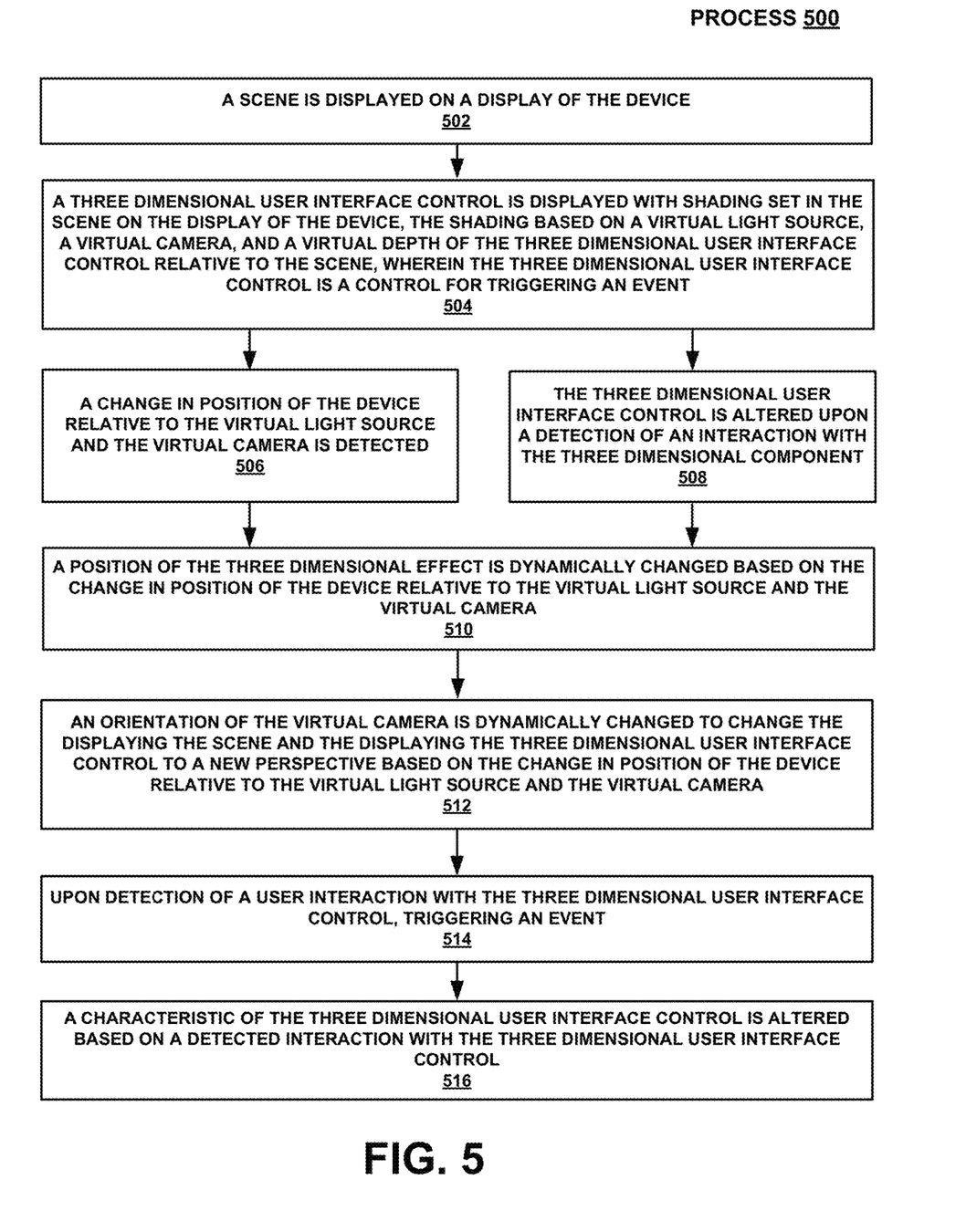
FIG. 5 illustrates a flowchart of an example method for displaying a three dimensional interface on a device, in accordance with embodiments of the present technology.

FIG. 5 is a flowchart illustrating process 500 for displaying a three dimensional interface on a device, in accordance with one embodiment of the present invention. In one embodiment, process 500 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by devices and user interface controls in FIGS. 1-4. Process 500 may be described as run time for an HRH user interface.

At 502, a scene is displayed on a display of the device. Such as display 120 of device 105 of FIG. 1. The scene may the same as scene 305 of FIG. 3A.

At 504, a three dimensional user interface control is displayed with three dimensional effects set in the scene on the display of the device, the three dimensional effects are based on a virtual light source, a virtual camera, and a virtual depth of the three dimensional user interface control relative to the scene. For example, the shading and lighting of user interface control 205 of FIG. 2. Process 500 may include a plurality of user interface controls that are different or identical from one another and may be place at different depths and locations within the scene or may be in a different scene in the same HRH user interface. Three dimensional effects may include shading, lighting, alterations, deformations, changes in shape, shadows, etc. of a user interface control or a layer or a combination thereof.

At 506, a change in position of the device relative to the virtual light source and the virtual camera is detected. This may be based on data from an input device associated with the device such as an accelerometer or a camera.

At 508, the three dimensional user interface control is altered upon a detection of an interaction with the three dimensional user interface control.

At 510, a position of the shading is dynamically changed based on the change in position of the device relative to the virtual light source and the virtual camera. Such changes may occur in an HRH user interface and may be in response to step 506, 508 or both.

At 512, an orientation of the virtual camera is dynamically changed to change the displaying the scene and the displaying the three dimensional user interface control to a new perspective based on the change in position of the device relative to the virtual light source and the virtual camera. For example, when a change in position of the device is detected, the position of the virtual camera is changed to render the HRH user interface according to a new perspective. The new perspective may include changes to the three dimensional effects of the user interface controls and/or layers. Thus the new perspective simulates a user viewing an actual three dimensional scene from a new perspective.

At 514, upon detection of a user interaction with the user interface control, triggering an event. For example, the event may be launching, running or executing logic or code and may control a software application or playback of media.

At 516, altering a characteristic of the three dimensional user interface control based on a detected interaction with the three dimensional user interface control. For example, the altering of the characteristic could be an alteration, a deformation, an animation, a movement, a change in position, and an execution of application logic. Moreover, the altering may be based on a physics engine. For example, an alteration may include a break, a bend, an elongation, a change in size, and a change in shape of the three dimensional user interface control or of a scene or layer.

Figure 6:
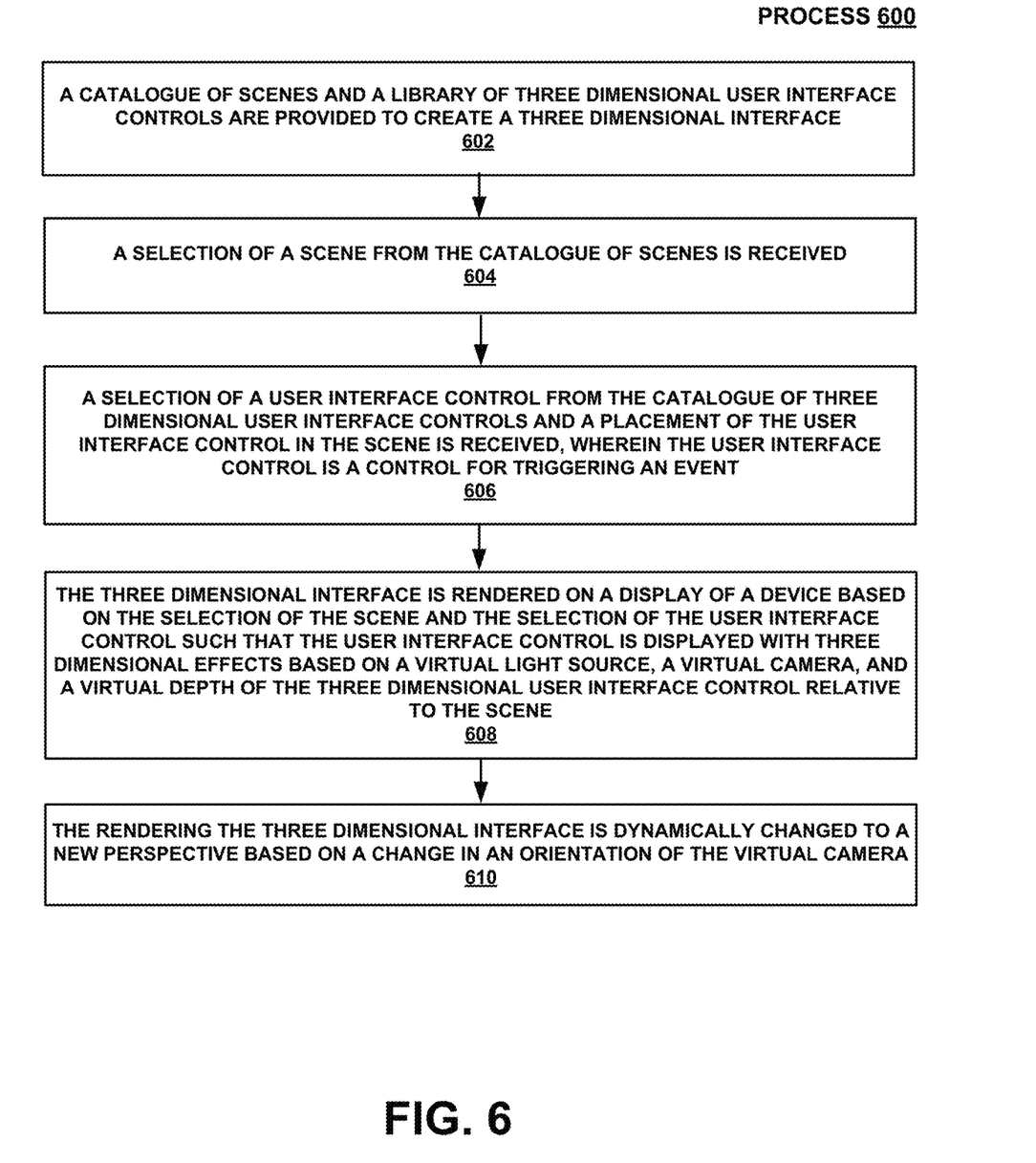
FIG. 6 illustrates a flowchart of an example method for providing tools to develop a three dimensional interface, in accordance with embodiments of the present technology.

FIG. 6 is a flowchart illustrating process 600 for providing tools to develop a three dimensional interface, in accordance with one embodiment of the present invention. In one embodiment, process 600 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 600 is performed by devices and components in FIGS. 1-4. Process 600 may be described as a developer interface or design time for an HRH user interface.

At 602, a catalogue of scenes and a catalogue of three dimensional user interface controls are provided to create a three dimensional interface. The catalogues may be provided via a developer interface executing at a device such as a computer system. The databases may be located on the computer system executing the developer interface or may be located remotely and accessed over a network.

At 604, a selection of a scene from the catalogue of scenes is received. For example, the developer may select a scene via the developer interface. A developer may select more than one scene for the same HRH user interface being developed. A catalogue may be a library, a binary library, a database, or some other repository.

At 606, a selection of a user interface control from the catalogue of three dimensional user interface controls and a placement of the user interface control in the scene is received. For example, the user may select a user interface control via the developer interface. A user may select more than one user interface control for the same HRH user interface being developed and may place more than one user interface control in the same scene. In one embodiment, the developer interface allows a user to click and drag a user interface control or scene into position when developing the HRH user interface. The developer can change attributes of the user interface control via the developer interface, for example, setting a color, shape, or opacity for the user interface control. The affect of these changes will be shown to the developer immediately within the developer interface. The developer then packages the HRH application and deploys it to a device such as device 105.

At 608, the three dimensional interface is rendered on a display of a device, e.g. device 105, based on the selection of the scene and the selection of the user interface control such that the user interface control is displayed with three dimensional effects based on a virtual light source, a virtual camera, and a virtual depth of the three dimensional user interface control relative to the scene. The three dimensional effects may include shading, lighting, shadow, altering, deforming, animations, movements, execution of logic, changes of shape, etc. The rendering may occur more than once using well known rendering techniques. In one embodiment, the HRH user interface is developed such that the 3D effects of the user interface controls and scenes in the HRH user interface may dynamically change as changes in perspective are detected or the user interacts with user interface controls. In one embodiment, the same catalogues of user interface controls and scenes at design time are deployed at run time. In one embodiment, only a portion of the catalogues of user interface controls and scenes at design time are deployed at run time.

At 610, the rendering the three dimensional interface is dynamically changed to a new perspective based on a change in an orientation of the virtual camera. Step 610 may be carried out in response to a detection of a change in position of the device. For example, when a change in position of the device is detected, the position of the virtual camera is changed to render the HRH user interface according to the new perspective. The new perspective may include changes to the three dimensional effects of the user interface controls and/or layers. Thus the new perspective simulates a user viewing an actual three dimensional scene from a new perspective.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as device 105 of FIG. 1. Described below is an example computer system or components that may be used for or in conjunction with aspects of the present technology such as the ability to run or create a three dimensional interface.

It is appreciated that that the present technology can operate on or within a number of different computer systems including general purpose networked computer systems, embedded computer systems, a personal computer such as a desktop computer, a laptop, a notebook, an electronic handheld device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
 a display;
 an accelerometer;
 a processor; and
 a memory having computer readable program code embedded therein for causing the processor to execute a three dimensional interface at the display, the three dimensional interface comprising:
  a scene comprising a foreground, a background, and at least one sidewall;
  a three dimensional user interface control set in the scene, wherein the three dimensional user interface control comprises three dimensional effects based on a virtual depth of the three dimensional user interface control relative to the scene; and
  a shadow rendered on the background and the at least one sidewall, the shadow caused by the three dimensional user interface control, wherein the shadow presents a visual effect that simulates the shadow on the at least one sidewall as tapering away from the foreground of the scene to the background;
wherein the accelerometer is configured to detect a change in position of the electronic device; and
wherein the processor is configured to render the three dimensional user interface control and the shadow within the scene in a new perspective with a change in the three dimensional effects based on the change in position of the electronic device.

2. The electronic device of claim 1, the three dimensional interface further comprising:
  a virtual light source.

3. The electronic device of claim 2, wherein the three dimensional effects are further based on a position of the virtual light source relative to the scene.

4. The electronic device of claim 2, wherein the accelerometer is configured to detect the change in position of the electronic device relative to the virtual light source.

5. The electronic device of claim 4, wherein the processor is configured to render the three dimensional user interface control and the shadow within the scene in the new perspective with the change in the three dimensional effects based on the change in position of the electronic device relative to the virtual light source.

6. The electronic device of claim 2, wherein the processor is configured to simulate a shine of the virtual light source by shading a portion of the three dimensional user interface control differently than another portion of the three dimensional user interface control.

7. The electronic device of claim 2, wherein the three dimensional effects are based at least in part the position of a user relative to the display and the virtual light source.

8. The electronic device of claim 7, wherein a position of the virtual light source relative the electronic device is static and does not change responsive to the change in the position of the user relative to the display.

9. The electronic device of claim 1, further comprising a camera.

10. The electronic device of claim 9, wherein the camera is also configured to detect a change in position of the electronic device.

11. The electronic device of claim 9, wherein the processor is configured to track movement of eyes of a user relative to the display using the camera.

12. The electronic device of claim 11, wherein the change in the position of the user relative to the display is a change in position of the eyes of the user relative to the display.

13. The electronic device of claim 9, wherein the processor is configured to track movement of a head of a user relative to the display using the camera.

14. The electronic device of claim 13, wherein the change in the position of the user relative to the display is a change in position of the head of the user relative to the display.

15. An electronic device comprising:
  a display;
  an accelerometer;
  a processor; and
  a memory having computer readable program code embedded therein for causing the processor to execute a three dimensional interface at the display, the three dimensional interface comprising:
    a virtual light source;
    a scene comprising a foreground, a background, and at least one sidewall;
    a user interface control set in the foreground of the scene; and
    a shadow rendered on the background and the at least one sidewall, the shadow caused by the user interface control, wherein the shadow presents a visual effect that simulates the shadow on the at least one sidewall as tapering away from the foreground of the scene to the background;
  wherein the accelerometer is configured to detect a change in position of the electronic device relative to the virtual light source; and
  wherein the processor is configured to render the user interface control and the shadow within the scene in a new perspective with a change in position of the electronic device.

16. The electronic device of claim 15, wherein the processor is configured to render the user interface control and the shadow within the scene in the new perspective based on the change in position of the electronic device relative to the virtual light source.

17. The electronic device of claim 15, wherein a position of the virtual light source relative the electronic device is static and does not change responsive to the change in the position of the user relative to the display.

18. A method for displaying a three dimensional interface on an electronic device:
  displaying a scene on a display of the electronic device, the scene comprising a foreground, a background, and at least one sidewall;
  displaying a user interface control set in the foreground of the scene on the display of the electronic device;
  displaying a shadow on the background and the at least one sidewall, the shadow caused by a position of a virtual light source relative to the user interface control, wherein the shadow presents a visual effect that simulates the shadow on the at least one sidewall as tapering away from the foreground of the scene to the background;
  detecting a change in position of the electronic device; and
  dynamically changing the shadow based on the change in position of the electronic device relative to the virtual light source.

19. The method of claim 18, wherein the user interface control is a three dimensional user interface control, the displaying the user interface control set in the foreground of the scene on the display of the electronic device comprises:
  displaying the three dimensional user interface control with three dimensional effects set in the scene on the display of the electronic device, the three dimensional effects based at least in part on the virtual light source.

20. The method of claim 19, further comprising:
  dynamically changing the three dimensional effects based on the change in position of the electronic device relative to the virtual light source.

* * * * *